(No Model.)
T. CARROLL.
CUTTING TOOL.
No. 423,413. Patented Mar. 18, 1890.
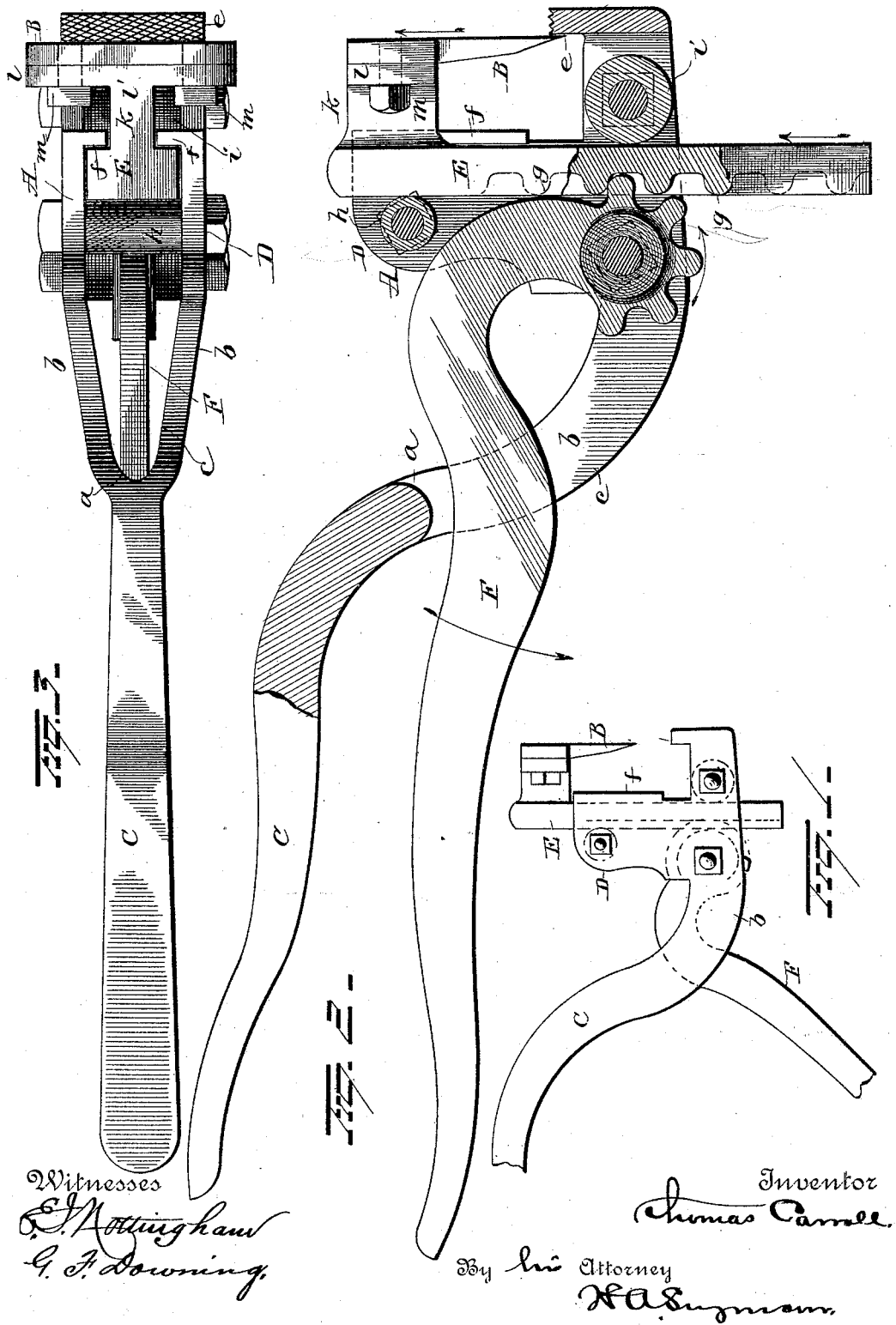
Witnesses
E. J. Nottingham
G. F. Downing
Inventor
Thomas Carroll
By his Attorney
H. A. Sugarman

UNITED STATES PATENT OFFICE.

THOMAS CARROLL, OF NOBLE, ASSIGNOR OF ONE-HALF TO W. H. WISE, OF WINFIELD, IOWA.

CUTTING-TOOL.

SPECIFICATION forming part of Letters Patent No. 423,413, dated March 18, 1890.

Application filed May 23, 1888. Serial No. 274,815. (No model.)

*To all whom it may concern:*

Be it known that I, THOMAS CARROLL, of Noble, in the county of Washington and State of Iowa, have invented certain new and useful Improvements in Cutting-Tools; and I do hereby declare the following to be a full, clear, and exact description of the invention, such as will enable others skilled in the art to which it appertains to make and use the same.

My invention relates to an improvement in devices for trimming hoofs of horses, shrubbery, &c.

The object of my present invention is to produce a device for trimming shrubbery, horses' hoofs, &c., which shall be simple in construction, positive in operation, and comparatively cheap to manufacture.

A further object is to so construct a tool for trimming hoofs, shrubbery, &c., that the blade may be easily removed when worn and another blade secured to the tool.

A further object is to provide a tool for trimming hoofs of horses in which a rest is furnished for the reception of the hoof.

A further object is to furnish a hoof-trimming tool with a reciprocating blade.

With these objects in view my invention consists in certain novel features of construction and peculiar combinations and arrangements of parts, as will be hereinafter set forth, and pointed out in the claims.

In the accompanying drawings, Figure 1 is a side elevation of the device in an open position. Fig. 2 is a longitudinal sectional view in closed position. Fig. 3 is a top plan view of the device.

The tool comprises, mainly, a housing-frame A, a reciprocating blade B, and actuating devices.

The handle C is bent into proper form and divided at the point $a$ to produce two arms $b\ b$, having an open slot $c$ between them, said arms being connected at their free ends by a plate $e$. This plate $e$ extends somewhat above the arms $b$, and is roughened on its top edge to produce a rest for the hoof of a horse and also a shearing-bar for the blade B.

Secured to or preferably made integral with the arms $b\ b$, and extending upwardly therefrom, are two housing-plates D D, provided at their outer edges with inwardly-projecting flanges $f$. Immediately in rear of the flanges $f$, and adapted to be guided thereby, is a sliding bar E, furnished on its rear face and preferably throughout the greater portion of its length with a series of notches to produce teeth $g$ between them, for a purpose presently explained.

A roller $h$, of wood or other suitable material, is journaled between the housing-plates D D near their upper ends, and is adapted to act as a guide for the reciprocating rack-bar E and prevent rearward displacement of the upper portion of said bar. The lower portion of the rack-bar E, where the same extends below the flanges on the housing-plates D D, is guided and prevented from forward displacement by means of a roller $i$, journaled between the forward portion of the arms $b\ b$.

The upper portion of the rack-bar is furnished with an integral outwardly-extending flange or web $k$, having oppositely-projecting ears $l\ l$ integral with its outer end, thus forming a T-shaped bracket $l'$, extending outwardly from the upper portion of the rack-bar nearly in line with the inner edge of the foot-rest $e$. The ears or lugs $l$ are provided with perforations for the reception of bolts or rivets $m$, by means of which the blade B is secured to the ears $l$ of the bracket $l'$. Said blade is thus adapted to reciprocate in rear of the rest $e$, the rear edge of which acts as a shearing-bar, in conjunction with the blade B, in the operation of cutting.

A handle or lever F, bent into hook shape at its forward end, is journaled in the slot $c$ between the arms $b\ b$, and provided at said forward end with a series of gear-teeth adapted to mesh with the rack-bar E. It will therefore be seen that when the handle F is turned on its bearing it will be caused to vibrate in the slot $c$ and raise and lower the rack-bar and blade B.

In the operation of my device for trimming the hoofs of horses, the hoof is first raised in the usual manner for shoeing and made to bear on the rest $e$. The handle F is then operated, and the rack-bar and blade carried thereby will be reciprocated and made to trim the hoof in an obvious manner.

It is evident that this implement is equally well adapted for trimming shrubbery, &c., and in such case the parts may advisably be made of smaller dimensions to more readily adapt the device to this use.

When a blade is worn out, it can be readily replaced by a new one.

Many slight changes might be made in the constructive details of my invention without departing from the spirit thereof or limiting its scope; hence I do not wish to limit myself to the precise details of construction herein set forth; but, Having fully described my invention, what I claim as new, and desire to secure by Letters Patent, is—

1. In a cutting-tool, the combination, with a handle constructed with a bifurcated jaw provided with a shearing-bar at its outer end, and a housing forming a guideway, of a rack-bar constructed to reciprocate in the guideway formed in the housing, and provided with a plate that extends in front of and outside of the housing, a knife detachably secured to the plate on the rack-bar, and a handle pivoted within the bifurcated jaw and provided with a segment of a pinion that meshes with the rack-bar, substantially as set forth.

2. In a cutting-tool, the combination, with a handle constructed with a bifurcated jaw having a shearing-bar at its outer end, and provided with a housing forming a guideway, of a rack-bar constructed to reciprocate in said guideway, a knife detachably secured to the rack-bar, a toothed lever or handle for operating the rack-bar, and anti-friction rollers journaled within the housing and arranged to bear against the opposite sides of the rack-bar, substantially as set forth.

3. In a cutting-tool, the combination, with a handle having a bifurcated jaw and provided with a shearing-bar at its outer end, and with a housing forming a guideway, of a bar constructed to reciprocate in the guideway formed in the housing and supported at points above and below the cutting-edge of the shearing-bar, a cutter secured to said reciprocating bar, and a handle pivoted to the bifurcated jaw for operating the reciprocating bar, substantially as set forth.

In testimony whereof I have signed this specification in the presence of two subscribing witnesses.

THOMAS CARROLL.

Witnesses:
 N. J. EICHER,
 A. McBARNES.